United States Patent Office 2,732,019
Patented Jan. 24, 1956

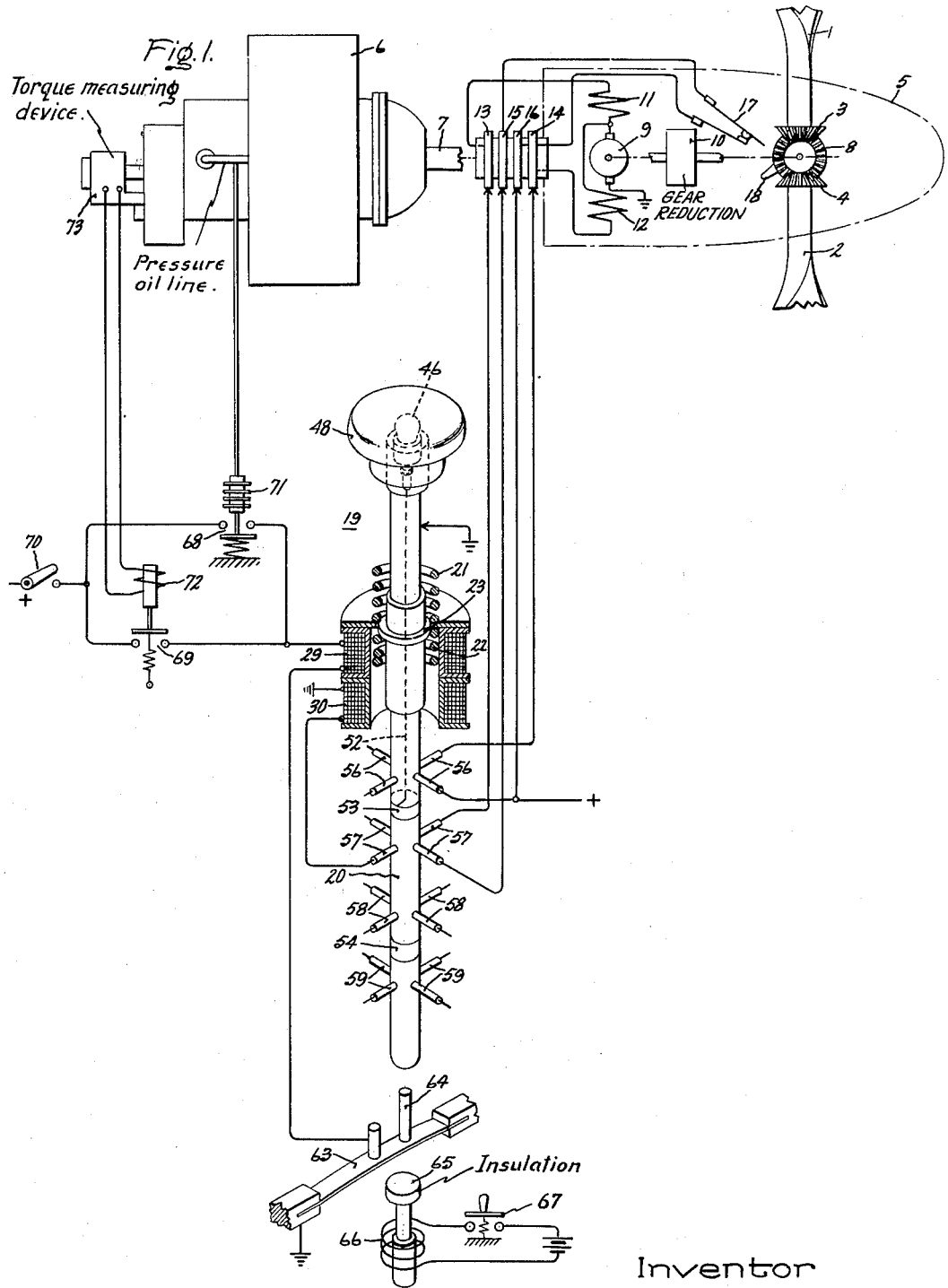

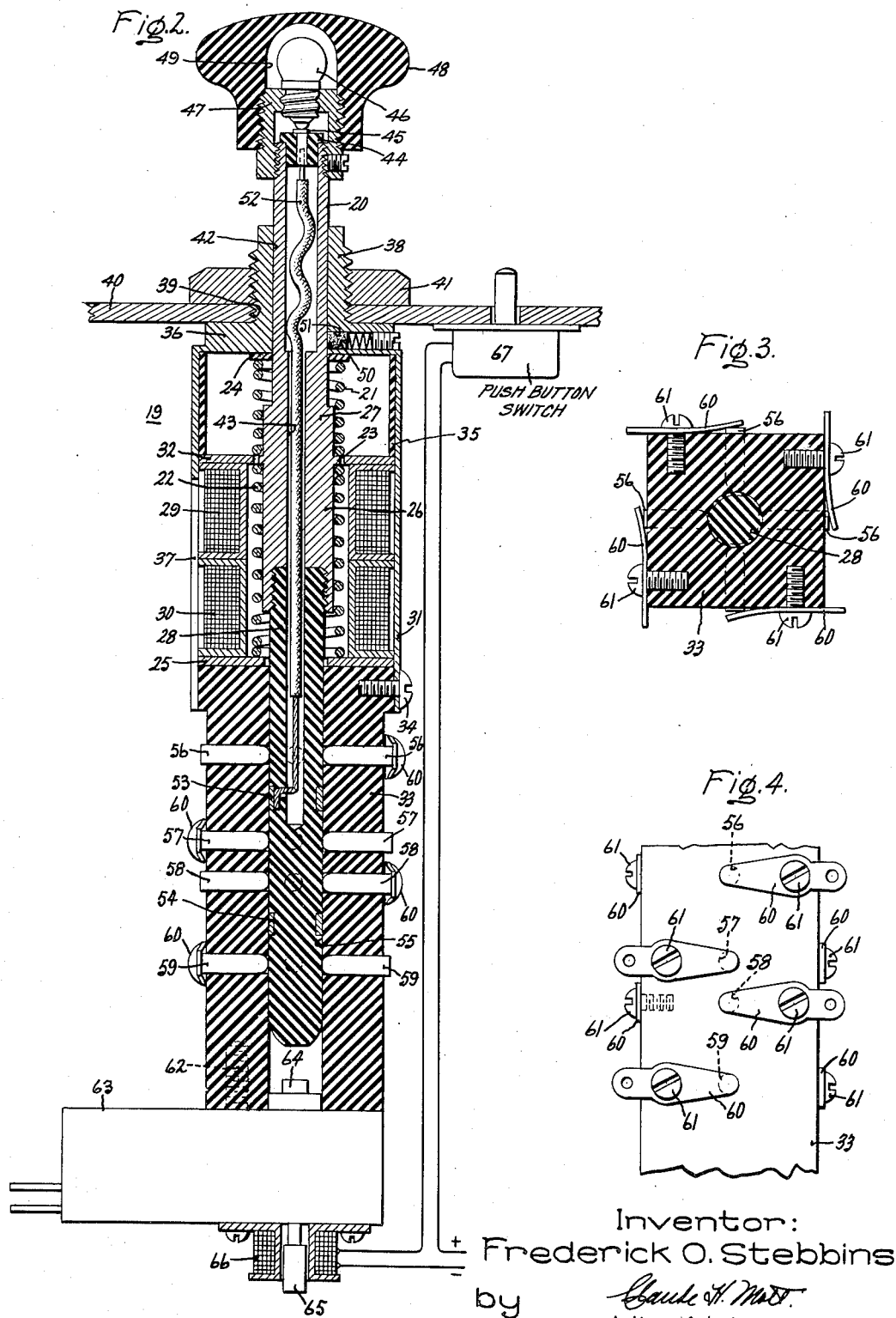

2,732,019

APPARATUS FOR FEATHERING AIRCRAFT PROPELLER BLADES

Frederick O. Stebbins, Schenectady, N. Y., assignor to General Electric Company, a corporation of New York Application July 28, 1951, Serial No. 239,052

7 Claims. (Cl. 170—135.72)

This invention relates to apparatus for changing the pitch of aircraft propeller blades, and more particularly to apparatus for automatically feathering the blades of a propeller upon the occurrence of a failure condition in the prime mover driving the propeller.

In multi-engine propeller-driven aircraft, it is the accepted practice to provide means for changing the blade pitch of the various propellers, each propeller being independently adjustable with respect to the others. One reason for this is that through minor adjustments of the blade pitch of the differing propellers, the power required to move the aircraft may be divided equally among the prime movers or engines. Another reason is that if any engine should fail during flight, it is necessary that the blades of its propeller be feathered in order to prevent the occurrence of dangerous vibrations. By feathering the blades, it is, of course, meant that the blade pitch is changed to a point where there is substantially no reaction between the blades and the air.

When an engine fails during flight, the continuing movement of the aircraft due to the driving force from the remaining engines causes the propeller of the faulty engine to turn or "windmill" in reaction to the air flow past it. Windmilling occurs when the propeller blades remain set at a pitch where they react with the air. The windmilling is at a much lower speed than that at which the other propellers are rotating and results in vibrations being set up in the wing mounting the faulty engine. These vibrations, if allowed to continue, are very often so severe as to actually shake the aircraft apart. In order to stop the vibrations, the blades of the propeller concerned are turned to the pitch called "full feather," where any forces due to the passing air flow are substantially equal on both sides of the blades. Since there is thus no longer any reaction between the propeller and the air flow, the windmilling of the propeller and the accompanying vibration come to a halt.

Most conventional propeller feathering systems are manually actuated, requiring the pilot to sense the engine failure and then to set the system in operation. Quite naturally, due to this human factor, it may be some time after engine failure before the feathering system is actuated. In fact, it may be the very vibrations that the system is intended to prevent that alert the pilot to the engine failure. Obviously, the sooner after engine failure that the feathering is begun, the fewer of these vibrations occur and the smaller is the danger to the aircraft and its occupants.

It is an object of this invention, therefore, to provide a new and improved propeller blade feathering apparatus automatically responsive to prime mover failure.

It is another object of this invention to provide a new and improved automatic propeller blade feathering apparatus which also may be manually actuated.

It is a further object of this invention to provide propeller blade feathering apparatus which ceases operation automatically when the propeller blades reach full feather.

It is still a further object of this invention to provide in such feathering apparatus a new and improved circuit controlling feathering switch.

It is a more specific object of the invention to provide a new and improved three-position switch for actuating propeller blade feathering equipment, either manually or automatically.

In carrying out my invention in one form thereof, I provide automatic, engine-failure responsive, propeller feathering apparatus including electrically-actuated means, for example a motor, to change the blade pitch. This actuated device is energized from circuits which are closed by means of a new and improved multi-position switch. With the switch in a first or normal position, no power is supplied to the actuated device; with the switch in a second position, the actuated device is energized to change the blade pitch toward full feather; and with the switch in a third position, the device is energized to change the blade pitch in the opposite direction from full feather. Automatic, electromagnetic means are provided both to move the switch to the second or feathering position upon a failure of the prime mover driving the propeller and also to hold the switch in that position until the blades reach full feather. When the blades reach full feather, the switch is released for automatic return to the neutral position, thereby deenergizing the pitch changing means. In addition to this automatic operation, the blades may also be feathered by manually moving the switch means to the feathering position, and may be defeathered by manually moving the switch means to the third or defeathering position.

The features of this invention which are believed to be novel and patentable are pointed out with particularity in the appended claims. The invention itself, however, both as to organization and mode of operation, together with further objects and advantages thereof, may be best understood by reference to the following description, to be taken in conjunction with the accompanying drawing in which:

Fig. 1 is a diagrammatic sketch of an automatic, engine-failure responsive, propeller blade feathering system embodying my invention; Fig. 2 is a cross-sectional view of a new and improved circuit controlling switch adapted for use in the system of Fig. 1; Fig. 3 is a sectional view of the switch taken on the line 3—3 of Fig. 2; and Fig. 4 is a fragmentary side view of the switch of Fig. 2 showing the spring biased contact terminals in detail.

Referring to Fig. 1, I have shown therein one form of the propeller feathering system of my invention as applied to change the pitch of propeller blades 1 and 2 which are mounted at their respective base ends on bevel gears 3 and 4, positioned in a hollow hub 5. The hub is rotatably driven from a prime mover, such as a radial aircraft engine 6, through a shaft 7, and in rotating causes a similar rotation of blades 1 and 2.

In order to change the pitch of blades 1 and 2, a gear 8 is provided which mates with and drives gears 3 and 4, gear 8 being itself rotated by an electrically actuated device, such as the reversible motor 9, through a gear reduction unit 10. Motor 9 has one armature and two series field windings 11 and 12, and the armature is connected at its one side to ground and at its other side to a terminal joining the one ends of field windings 11 and 12. At their other ends, field windings 11 and 12 are connected respectively to the slip rings 13 and 14 mounted on shaft 7.

Also mounted on shaft 7 is another pair of slip rings 15 and 16, and connected across these rings is a normally closed limit switch 17. Limit switch 17 is opened, however, when blades 1 and 2 reach their full feather position, by means of a cam 18, here shown as mounted on gear 8. It should be understood though that the invention is not limited to a cam actuated switch, since any means responsive to the blades reaching full feather may be employed to break the circuit in which switch 17 is included.

The various slip rings, and thus switch 17 and motor 9, are connected through contact brushes to various energizing circuits which are completed by switching means comprising a circuit controlling switch 19. As shown diagrammatically at Fig. 1 and structurally at Figs. 2, 3 and 4, switch 19 has a movable contact mounting member or shaft 20 which is spring biased to a normal mid-position and is movable therefrom against the bias to second and third positions. The movement of shaft 20 in the illustrated switch is axial, but as will become more increasingly obvious hereinafter, switches having a contact mounting member movable between the various positions with a pivotal motion or a rotary motion could be constructed to produce the same results. In the illustrated switch, the means biasing shaft 20 to its normal mid-position comprises a pair of coil springs 21 and 22, which at their one ends bear against a flange 23 on the shaft 20, and which at their other ends bear respectively against washers 24 and 25. These washers 24 and 25 also serve to limit the travel of shaft 20 by engaging respectively the opposite shoulders formed on shaft 20 by a central section 26 of increased diameter.

Actually, shaft 20, as viewed in Fig. 2, comprises an upper portion 27 formed of electrically-conducting magnetizable material, and a lower portion 28 formed of insulating material, the lower portion being fastened in a recess provided in the lower end of the upper portion by any suitable means, such as screw threads. Upper portion 27 includes the increased diameter portion 26 and serves as a magnetic plunger for a closing coil 29 and a holding coil 30, both of which are positioned within an enclosing shell 31 between the aforementioned washer 25 and another washer 32. Shell 31 fits over and is secured at one end to an insulating terminal mounting block 33, a screw 34 serving as the securing means. Washer 25 rests on the upper end of block 33 and a spacing ring 35 is positioned between washer 32 and the roof portion 36 of shell 31 so that the entire coil and washer structure is held in a fixed position within shell 31. A slot 37 is provided in shell 31 for bringing out the leads connected to coils 29 and 30.

Formed on roof portion 36 of shell 31 is a threaded boss 38, which extends through a recess 39 formed in a switch mounting plate, such as the firewall 40 of the aircraft cockpit. A nut 41 screwed on boss 38 and engaging firewall 40 holds the switch in place.

Boss 38 and roof portion 36 are provided with a recess 42 through which extends the upper end portion of shaft 20. Shaft 20 itself is provided with a bore 43, which extends through shaft portion 27 and partially through shaft portion 28. Bore 43 is enlarged at the upper end of shaft 20 and an insulating contact holder 44 is mounted therein. Holder 44 mounts a contact 45 which engages one terminal of a lamp 46 that is held by an electrically conducting socket member 47, the other terminal of lamp 46 being in contact with member 47. Member 47 is threaded on the end of shaft 20 and in turn has threaded on it a knob 48 formed of any suitable transparent or translucent material. Knob 48 is provided with a recess 49 to accommodate lamp 46 and supplies the gripping means necessary for the manual movement of shaft 20.

As mentioned above, lamp 46 is connected for energization between member 47 and contact 45. Member 47 is grounded through shaft 20 by means of a spring-biased brush 50 slidably positioned in a slot 51 in the roof portion 36 of shell 31. However, contact 45 is connected by means of an insulated lead 52, which lies in bore 43, to a contact member or ring 53 positioned on insulated portion 28 of shaft 20. A similar ring 54 is positioned on insulated portion 28 somewhat below ring 53. These contact rings may be formed of various conducting materials, but silver is preferred due to its characteristic of conducting well even when black and pitted.

As shown in Fig. 2, insulated portion 28 is accommodated by an axially extending recess 55 in block 33, and in the mid-position or neutral position of shaft 20, ring 53 lies between two axially displaced sets of terminals or brushes 56 and 57, which are slidably positioned in radially extending recesses in insulating block 33. Likewise, ring 54 lies between two similar axially displaced sets of terminals or brushes 58 and 59. As is more fully shown in Figs. 3 and 4, the various brushes of each set are biased respectively against shaft 20 by springs 60, which are secured to block 33 by screws 61 and bear against the outer ends of the brushes.

The various sets of brushes are so positioned that when shaft 20 is displaced downwardly to its second or feathering position, ring 53 is contacted by brushes 57 and ring 54 is contacted by brushes 59, whereas when shaft 20 is displaced upwardly to its third or defeathering position, ring 53 is contacted by brushes 56 and ring 54 is contacted by brushes 58. As hereinbefore mentioned, the contacts between washers 24 and 25, and the ends of increased diameter portion 26 respectively limit the travel of shaft 20 in the two directions, stopping it with the contact rings in the contact engaging positions.

Mounted at the end of block 33 by means of a screw 62 is a circuit breaker switch 63 having an actuating rod 64 which extends into bore 55. When shaft 20 is displaced downwardly in bore 55 to the feathering position, it forces rod 64 downwardly and opens switch 63 just as it reaches the feathering position, i. e., at the same time as rings 53 and 54 make contact respectively with brushes 57 and 59. Once switch 63 is opened by rod 64, it stays locked open until closed by a closing plunger 65. Plunger 65 may be manually operated directly or may be solenoid operated by means of a coil 66 which is energized through a manually operated pushbutton switch 67, here shown as mounted on firewall 40.

Referring again to Fig. 1, therein is shown diagrammatically one manner in which switch 19 may be connected in a propeller feathering system embodying this invention and using a grounded D.-C. power supply. The ungrounded or positive side of the power supply is connected directly to one of contacts 56 and to slip ring 16. Another of contacts 56 is connected to slip ring 14; and various of contacts 57 are connected respectively to slip rings 13 and 15 and to one terminal of holding coil 30, the other terminal of coil 30 being grounded. By these connections and others hereinbefore described, limit switch 17 is placed between the positive side of the power source and one of contacts 57; the armature of motor 9 is placed in series with field 11 between another of contacts 57 and ground; holding coil 30 is placed between one of contacts 57 and ground; and the armature of motor 9 is placed in series with field 12 between one of contacts 56 and ground.

Besides these connections involving the various contacts or terminals of switch 19, there are also provided means for energizing and deenergizing closing coil 29. One side of coil 29 is grounded through switch 63 while the other side is connected to a pair of parallel-connected engine failure responsive switches 68 and 69 which are held open during normal operation of engine 6, i. e., are normally open when engine 6 is operating properly, as shown in Fig. 1. These switches 68 and 69 are in turn connected to the ungrounded side of the power supply through a manually-operated switch 70. Switch 68 is spring biased to a closed position and is actuated normally to the open position by means of an engine oil pressure responsive device, such as expansible bellows 71. When engine oil pressure is above a certain danger level, bellows 71 expands sufficiently against the bias of switch 68 to keep the switch in the open position, but when the pressure drops below the danger level, the switch automatically recloses due to its bias.

Switch 69 is also spring biased to a closed position and is operated normally to the open position by a solenoid 72 which is energized from a torque measuring device 73 direct-connected to engine 6. Device 73 may be any of those torque measuring devices well known in the art, and here produces a voltage sufficient to keep the solenoid 72 picked up whenever the engine 6 is producing a torque equal to or greater than a predetermined value. If, however, the engine torque should drop below that value, the voltage produced by device 73 is insufficient to keep solenoid 72 picked up so that the switch 69 is closed due to its spring bias. Besides switches 68 and 69 which are thus responsive respectively to engine oil pressure and engine torque, various other switches responsive to other indicators of engine failure, for example, an over-temperature indicator, may be placed in a similar position in the actuating circuit for coil 29.

With switch 70 closed, the system feathers blades 1 and 2 automatically upon a loss either of engine torque or of engine oil pressure. If either switch 68 or switch 69 closes, closing coil 29 is immediately energized and magnetically pulls shaft 20 into the feathering position, with ring 53 engaging contacts 57. As shaft 20 moves completely into the feathering position, the closing coil circuit is opened by means of lock-out circuit breaker switch 63, but the contact of ring 53 with contacts 57 energizes holding coil 30 so that the shaft 20 remains held in the feathering position. The contact between ring 53 and the various contacts 57 also energizes motor 9 through field 11, causing it to drive gear 8 in a direction to change the pitch of blades 1 and 2 toward full feather. Moreover, this contact causes lamp 46 to light up, indicating that the feathering cycle is in process. When the blades reach full feather, cam 18 opens limit switch 17 and thereby opens the circuit between the positive side of the power supply and contacts 57. This, of course, not only deenergizes motor 9 so that the propeller blades remain stationary, but also removes excitation from coil 30 so that shaft 20 returns to its neutral position.

Besides this automatic feathering, the pitch of blades 1 and 2 may also be varied by manually moving shaft 20 to the feathering position or to the defeathering position. When the switch is moved manually to the feathering position, the action is the same as that described above for automatic feathering since coil 30 is energized no matter whether the shaft is moved automatically or manually to the feathering position. If only a slight feathering is desired to adjust the load on engine 6, then shaft 20 is manually pulled out of the feathering position when the desired blade pitch is secured. The magnetic pull of holding coil 30 on shaft 20 is such that it can be overcome manually without an undue amount of effort.

Conversely, if it is desired to defeather the blades, shaft 20 is pulled manually to the defeathering position, where ring 53 engages contacts 56. This energizes the armature through series field 12 and causes the blades to move away from full feather. The contact also energizes lamp 46 to indicate that the defeathering is in process. The shaft must, however, be held manually in the defeathering position since in the illustrated embodiment no holding coil is provided for that purpose. Thus, this system not only provides automatic feathering of the propeller blades upon engine failure, but also provides means for adjusting the pitch of the blades at the pilot's desire. Moreover, the automatic feature of the system may be cancelled by the opening of switch 70.

In the illustrated embodiment, the magnetic pull of closing coil 29 is appreciably greater than that of holding coil 30, perhaps even several times as great, to insure the immediate movement of shaft 20 to the feathering position upon the closing of either of the failure responsive switches 68 and 69. The closing coil energizing circuit is opened, however, and coil 30 energized when shaft 20 moves into the feathering position so that if the pilot should for some reason desire to interrupt the automatic feathering cycle, he need overcome only the small force such as is supplied by the holding coil. The mittens ordinarily worn by pilots at high altitudes would make it extremely difficult for them to overcome the larger force of the closing coil. One example of when the pilot would wish to interrupt the feathering cycle would be if a failure occurred in torque measuring device 73 so that switch 69 closed, although there was nothing wrong with engine 6. The pilot, seeing that engine 6 was actually operating satisfactorily, would then pull the switch shaft out of the feathering position and into the defeathering position to return blades 1 and 2 to the proper pitch. Since switch 63 is of the type which stays open until manually reset, the movement of shaft 20 away from the feathering position does not permit the reenergization of closing coil 29 to oppose the manual force exerted by the pilot. This system then provides a double safety factor, for it not only provides for automatic feathering upon engine failure, but also makes allowance for a failure in the sensing devices themselves.

No circuits have been shown as connected to contacts 58 and 59. They are provided for such auxiliary or accompanying circuits as the user of the switch may desire.

While in accordance with the patent statutes there has been illustrated and described what at present is considered to be the preferred embodiment of this invention, it will be obvious to those skilled in the art that numerous alterations and modifications may be made therein without departing from the invention, and it is, therefore, aimed in the appended claims to cover all such modifications as fall within the true spirit and scope of this invention.

What I claim as new and desire to secure by Letters Patent of the United States is:

1. In an automatic propeller feathering apparatus, multi-position switching means comprising a member carrying a plurality of contacts and being biased to a normal position and being manually movable against the bias in opposite directions to second and third positions and electromagnetically movable against the bias from normal position to said second position, a plurality of terminals engaging said contacts in each of said second and third positions, a first electromagnetic means including an armature connected with said member for moving said member to said second position, circuit breaking means operated by said member for disabling said electromagnetic means upon said member reaching said second position, and a second electromagnetic means energizable through a contact on said member when said member is moved to said second position for retaining said contact member in said second position upon its movement therein, said circuit breaking mechanism disabling said first electromagnetic means from further operation and including means that are manually resettable to enable further operation thereof.

2. In an automatic propeller feathering apparatus, multi-position switching means comprising a contact carrying member biased to a normal position and being manually movable against the bias in opposite directions to second and third positions and electromagnetically movable against the bias from normal position to said second position, a plurality of terminals engaging a contact on said member in each of said second and third positions, a first electromagnetic means including an armature adapted to be energized by a constant voltage source, said armature moving said member to said second position, circuit breaking means operated by said member for disabling said electromagnetic means upon said member reaching said second position, and a second electromagnetic means energizable by a constant voltage source through a contact on said member when said member is moved to said second position for retaining said member in said second position upon its movement therein, said circuit breaking mechanism disabling said first electromagnetic means from further operation, and being manually resettable to enable further operation thereof.

3. In an apparatus for feathering the blades of a propeller driven by a prime mover, electrically actuated means for changing the pitch of said blades in either direction, means including a solenoid and a switch means that is operated in response to a failure condition of the prime mover for controlling said electrically actuated means, means for electrically aiding the manual disengagement of said switch means after said switch means has been operated, said electrically aiding means including a circuit breaker mechanism responsive to engagement of said switch means for deenergizing said solenoid, a second solenoid connected in circuit with said switch means and responsive to engagement of said switch means for maintaining said switch means in closed condition with a holding force little more than said spring biasing, whereby said switch means may be manually disengaged by the application of a much lesser force than provided by said solenoid in actuating said switch means thereby simplifying the manual interruption of said feathering operation.

4. In an apparatus for feathering the blades of a propeller driven by a prime mover, electrically actuated means for changing the pitch of said blades in either direction, a spring biased switch means for controlling said electrically actuated means, means including a solenoid energized in response to a failure condition of the prime mover for actuating said switch means into engagement, means including a circuit breaker mechanism responsive to engagement of said switch means for deenergizing said solenoid, a second solenoid connected in circuit through said switch means and energized by engagement thereof for maintaining said switch means in engagement with a holding force little more than said spring biasing and with a much lesser holding force than said first solenoid, whereby said switch means may be manually disengaged by the application of a much lesser force than provided by said solenoid in actuating said switch means, said circuit breaker means disabling said solenoid from further energization and including means that are manually resettable to enable further energization thereof.

5. In an apparatus for feathering the blades of a propeller driven by a prime mover, electrically actuated means for changing the pitch of said blades in either direction, means including a solenoid energized in response to a condition of the prime mover, a spring biased switch means operated by said solenoid to control said electrically actuated means, means including a circuit breaker mechanism responsive to operation of said switching means for deenergizing said solenoid, a second solenoid connected in circuit through said switch means and energized after operation thereof for maintaining said switch means in operated condition with a holding force little more than said spring biasing, said circuit breaking mechanism including means for preventing subsequent energization of said solenoid after deenergization thereof and including means that are manually resettable to enable subsequent energization thereof.

6. In an apparatus for feathering the blades of a propeller driven by a prime mover, electrically actuated means for reversibly changing the pitch of said blades, means including a solenoid energized in response to a condition of the prime mover, a spring biased switch means operated by said solenoid to control said electrically actuated means, means including a circuit breaker mechanism responsive to engagement of said switch means for deenergizing said solenoid, a second solenoid connected in circuit through said switch means and energized after operation thereof for maintaining said switch means in an operated condition with a holding force little more than said spring biasing, said circuit breaker mechanism including means for disabling said solenoid from responding to subsequent conditions of the prime mover and including means for manually resetting said circuit breaking mechanism to enable subsequent energization of said solenoid in response to said prime mover.

7. In an apparatus for automatically feathering the blades of a propeller driven by a prime mover, reversible motor means for changing the pitch of the blades in either direction, a circuit including a normally open switching means for energizing said reversible motor means, closing electromagnetic means energizable in response to a condition of the prime mover for closing said switching means, holding electromagnetic means responsive to the closing of said switching means for holding closed said switching means, circuit breaker means for deenergizing said closing electromagnetic means upon the closing of said switching means and preventing subsequent energization thereof, means for disabling said holding means upon the completion of the feathering operation permitting said switching means to open and deenergize said motor means, and a manually controlled means for resetting said circuit breaker to enable subsequent energization of said closing electromagnetic means in response to said prime mover.

References Cited in the file of this patent

UNITED STATES PATENTS

| | | |
|---|---|---|
| 599,344 | Murphy | Feb. 22, 1898 |
| 1,149,735 | Creveling | Aug. 10, 1915 |
| 1,438,727 | Schwagermann | Dec. 12, 1922 |
| 1,980,796 | Goff | Nov. 13, 1934 |
| 2,489,185 | Johnson | Nov. 22, 1949 |
| 2,591,336 | Bordelon | Apr. 1, 1952 |
| 2,601,901 | Muma | July 1, 1952 |
| 2,602,517 | Schroeder et al. | July 8, 1952 |
| 2,605,849 | Bordelon | Aug. 5, 1952 |
| 2,611,843 | Bourne | Sept. 23, 1952 |

OTHER REFERENCES

Aviation Maintenance and Operations, pp. 30–31, December 1947.